United States Patent
Bagarelli et al.

(10) Patent No.: US 8,390,235 B2
(45) Date of Patent: Mar. 5, 2013

(54) METHOD AND HARDWARE SYSTEM FOR DRIVING A STEPPER MOTOR IN FEED-FORWARD VOLTAGE MODE

(75) Inventors: Fulvio Giacomo Bagarelli, Cremona (IT); Vincenzo Marano, Muggiò (IT); Enrico Poli, Aymavilles (IT)

(73) Assignees: Dora S.p.A., Aosta (IT); STMicroelectronics S.R.L., Agrate Brianza (MB) (IT)

( * ) Notice: Subject to any disclaimer, the term of this patent is extended or adjusted under 35 U.S.C. 154(b) by 420 days.

(21) Appl. No.: 12/779,591

(22) Filed: May 13, 2010

(65) Prior Publication Data
US 2010/0289445 A1 Nov. 18, 2010

(30) Foreign Application Priority Data
May 14, 2009 (IT) .............................. VA2009A0031

(51) Int. Cl.
*H02P 8/00* (2006.01)
(52) U.S. Cl. .......................... 318/696; 318/685; 318/492
(58) Field of Classification Search .................. 318/696, 318/685, 492, 700, 802, 9, 801, 599
See application file for complete search history.

(56) References Cited

U.S. PATENT DOCUMENTS

| 5,216,345 A | 6/1993 | Eyerly ........................... 318/685 |
| 6,150,789 A | 11/2000 | Pulford, Jr. .................... 318/685 |
| 2009/0058330 A1* | 3/2009 | Boling et al. ................. 318/244 |

FOREIGN PATENT DOCUMENTS
EP 0736961 9/1996

* cited by examiner

*Primary Examiner* — Karen Masih
(74) *Attorney, Agent, or Firm* — Allen, Dyer, Doppelt, Milbrath & Gilchrist, P.A.

(57) ABSTRACT

A method of driving a stepper motor in a feed-forward voltage mode may include for a desired speed for the stepper motor setting an amplitude of a sinusoidal phase voltage of the stepper motor to be equal to a sum of an expected back-electromotive force (BEMF) amplitude estimated as a function of the desired speed, and a product of a desired phase current amplitude and an estimated absolute value of an impedance of the stepper motor.

22 Claims, 14 Drawing Sheets

METHOD AND HARDWARE SYSTEM FOR DRIVING A STEPPER MOTOR IN FEED-FORWARD VOLTAGE MODE

FIELD OF THE INVENTION

This invention relates to techniques for driving electric motors and more particularly to a method and a related hardware system for driving a stepper motor in a feed-forward voltage mode.

BACKGROUND OF THE INVENTION

Stepper motors are electric motors that move by increments, or steps, rather than turning smoothly as conventional electric motors. When windings of a stepper motor are energized, magnetic fields are generated and a rotor of the stepper motor turns to a certain position and stays there unless or until different windings are energized.

The stepper motor may be capable of withstanding an external torque applied to its shaft once the shaft has come to rest with current applied. This torque is typically called holding torque. The holding torque is typically at a maximum when the rotor and stator fields are orthogonal ($\beta=90°$), and in general it also varies depending on the position. This variation is caused by the detent torque, which adds and subtracts from the electrically induced torque when the shaft of the motor moves.

The difference between the produced torque and detent torque makes the motor rotate. To avoid missing a step rotation, sufficient electrical current should be forced to overcome the detent torque. Loss of the step rotation may result in a stall of the motor.

Typically, current mode driving may be implemented for driving stepper motors. Examples of monolithic circuits functioning in a current mode are the L6208 and L6228 devices available from STMicroelectronics, the A3977 available from Allegro, the TMC236 available from Trinamic, and the TB62201 available from Toshiba.

Many current mode control circuits may use a (PWM) pulse width modulation technique for regulating phase current. For this reason, hereinafter reference will be made to a PWM driving mode, though the same considerations hold similarly for an analog driving mode.

A common current mode driving technique may limit the phase current to a reference peak value using a sense comparator. This type of control is also called PWM peak current control and is illustrated in FIG. 1. Typically, this control is affected by an error due to the current ripple, the amplitude of which is hardly controllable as it may be affected by numerous factors, such as the supply voltage of the power bridge, the phase current level, the PWM switching frequency, and the electrical parameters of the motor.

In the PWM peak current control mode, the peak current value (i.e. the peak torque value) is regulated, and not its average value. Therefore, unpredictable and non-negligible error that may be introduced by the inevitable current ripple may not permit driving with a large number of micro-step divisions because the torque error may be larger than the separation between the micro-step reference values.

An alternative technique of driving brushless motors includes adjusting the drive voltage of the motor to control the average voltage applied to the phase load instead of the maximum phase current. This type of control may be implemented either by applying a continuous voltage or by PWM driving the power stage. In this case, when the motor is at rest or is moving very slowly back (electromotive force voltage is negligible), the average phase voltage is:

$$\overline{V}_{PHASE}=V_S \cdot D$$

where D is the duty cycle of the voltage applied to the motor phase and $V_s$ the voltage supply of the power stage. The average phase current is:

$$\overline{I}_{PHASE} = \frac{\overline{V}_{PHASE}}{R_S + R_L} = \frac{V_S \cdot D}{R_S + R_L} \cong \frac{V_S \cdot D}{R_L},$$

where $R_L$ is the load resistance and $R_s$ is the resistance of a shunt resistor, if used. In this way, the average phase current may be regulated by regulating the PWM duty cycle of the power stage.

One of the main advantages of voltage mode driving is that the driving system controls the average value of the phase current and not its peak value. In FIG. 2, a basic architecture of a voltage mode driver is shown.

When the motor is running at high speed and the back-electromotive force (BEMF) is no longer negligible, the phase currents may have the same frequency and shape of the applied phase voltage and are outphased from the phase voltage by the load angle. The load angle represents the difference between stator magnetic field vector angle and rotor magnetic field vector angle and may depend on the load torque, the holding torque and the speed.

The amplitude of the BEMF may be equal to $k_E \cdot \omega_{EL}$, wherein $\omega_{EL}$ represents the electrical frequency and $k_E$ is the electric constant of the motor.

In a voltage driving mode, the amplitude of the current may not have a fixed value, but may adapt, by itself, to the load condition when the load torque varies, to reach an equilibrium state. In the voltage mode, the equation that ties the current $I_{eq}$ to the load torque is:

$$T_{load}(\alpha) \propto I_{eq}(\alpha) \cdot BEMF \cdot \cos(\alpha)$$

wherein $I_{eq}$ is the resultant value of the amplitude of the two phase currents, $\propto$ means "proportional to", $\alpha$ is equal to $\pi/2-\beta$ and represents the angle between the BEMF voltage and the equivalent current.

In FIG. 3 a time graph of the produced mechanical power (proportional to the produced torque) is shown. Even if the phase current in voltage mode driving is not purely sinusoidal, as it may be in current mode driving, the final produced torque may not be more distorted than for a sinusoidal phase current. The reason is that, if the BEMF, as most often is the case, is not sinusoidal because of a motor geometry not being perfectly regular, then application of a purely sinusoidal phase current on the stator windings may not ensure generation of a constant torque.

In addition, the peculiarity of a voltage driving mode to produce phase currents of a constant amplitude makes the control more flexible, and the torque uniformity may be comparable to that obtained with current mode driving. Stepper driving applications may not make use of the voltage mode driving technique because of numerous significant drawbacks that may limit the effective performance of such a driving approach.

A problem with voltage mode driving may include the loss of the effective average produced torque, due the BEMF voltage when the speed of the motor increases. Such uncontrolled decreasing of average produced torque may cause loss of steps, and even the complete stall of the motor during acceleration. This issue may be very likely in stepper motors, in which the electric constant $K_E$ is relatively large in respect to other types of motors, and thus, relatively small speeds may be sufficient to generate relatively large BEMF voltages that may lead to a loss of steps.

FIG. 4 illustrates the various electrical parameters of a stepper motor driven in the voltage mode during a constant acceleration. The dashed curves are related to the other phases of the stepper motor. Following the traditional approach, where the current ratio (but also the voltage ratio) may be equal to the tangent of the motor speed, the optimal voltage waveform to be applied on the two phases may include two sinusoidal waveforms respectively outphased by 90° degrees, to produce the same torque with every rotor angle.

In terms of an equivalent electrical circuit, the BEMF voltage can be represented by a sinusoidal voltage generator in series with the phase inductance, having an amplitude proportional to the motor speed, and a frequency equal to the motor speed. The phase of the BEMF may depend on the load angle between the stator and rotor fields.

FIG. 4 shows that the increasing BEMF decreases the phase current, and that the applied torque to the rotor decreases as the speed increases. The main problem of the voltage mode approach is that the produced torque may decrease to the detent torque value, thus causing the stepper motor to lose steps, or completely stall.

In a stepper motor driven in the voltage mode, the amplitude of the phase current is typically proportional to the amplitude of the BEMF. Since the BEMF amplitude may be proportional to the rotational speed of the motor ($|BEMF|=k_E f_{EL}$, where $f_{EL}$, is the electrical frequency of the motor in Hz), for a constant amplitude of the voltage applied to each phase winding, the amplitude of the phase current decreases when speed increases. This may cause a reduction of the produced torque, which may be insufficient to overcome the detent torque and may lead to a stall condition.

In voltage mode control systems for brushless motors (BLDC), a V/f or k·f control technique may be implemented for compensating the induced BEMF, but brushless and stepper motors are significantly different from each other. For example, BLDC motors typically have good performance while rotating. They typically operate at a relatively high speed, and the stator magnetic fluxes are typically controlled synchronously with the rotor position to adjust the load angle, thus increasing the driving efficiency and reducing the torque ripple. Stepper motors typically have good performance in assuming angular positions. They typically operate in a wide range of speeds (from fractions of step/second to thousands step/second), but their task is accurate positioning in a steady state, without missing steps. For fast positioning, they should function at a relatively high speed, and even with the problems associated with generation of a large BEMF.

These differences may make the techniques of BEMF compensation that are effectively used in driving a BLDC motor ineffective for a stepper motor. This is illustrated in FIG. 5, that illustrates a graph of the characteristics of phase current magnitude as a function of the stepping frequency Istep (motor speed).

The waveforms correspond to the resulting phase current under voltage mode driving respectively without compensation and with BLDC standard k·f compensation, where k factor is the electrical constant $K_E$ of the motor. Even using the k·f compensation, the control of the phase current may be still far from acceptable because of the large variations of the phase current at a relatively low speed, and of the significant reduction of the phase current when the speed increases.

SUMMARY OF THE INVENTION

It has been found that it is possible to drive a stepper motor in a voltage mode while reducing fluctuations of the phase current produced in the stator windings throughout a speed range. This result may be obtained by driving a stepper motor in a feed-forward voltage mode with an appropriate control characteristic.

According to the method, the control characteristic is such that the drive voltage of the phase windings of the stepper motor may be set equal to the sum of the expected back-electromotive force (BEMF) estimated for a desired speed of the stepper motor, and the product of a desired amplitude of phase current (Iphase) by an estimated value of the motor impedance.

According to another embodiment, the characteristic control curve may be approximated by straight line segments. The first segment may start from a minimum value (min) for speed values smaller than a pre-fixed minimum speed, and may increase with a fixed slope ($\sigma_{st}$) for speed values greater than the minimum speed. The minimum value (Kvalmin), the minimum speed, and the slope ($\sigma_{st}$) may be pre-determined as a function of nominal values of the electrical parameters of the stepper motor, and of an estimated value of back-electromotive force (BEMF) induced on the stator windings.

According to yet another embodiment, the stepper motor may be driven in a PWM mode at a fixed switching frequency. The control characteristic may determine the duty-cycle in function of the desired speed.

According to yet another embodiment, the percentage fluctuation ($\delta_{vs}$) of the supply voltage on the supply line of the stepper motor about its nominal value may be estimated. The effective phase voltage for the desired speed of the stepper motor may be set as the ratio between the phase voltage determined according to the above method and the estimated percentage fluctuation ($\delta_{vs}$).

According to still yet another embodiment, an alarm flag may be generated for signaling an in progress or imminent stall condition of the stepper motor driven in a feed-forward voltage mode by measuring the phase current absorbed by the stepper motor and comparing the measured current with a threshold. The alarm flag may be generated when the threshold is surpassed.

A hardware control system of a stepper motor for implementing the method is also disclosed.

DETAILED DESCRIPTION OF THE PREFERRED EMBODIMENTS

According to the method, the BEMF voltage may be compensated to keep constant the amplitude of the phase current when the motor speed changes. The compensation technique provides for an accurate regulation of the phase current even at relatively low speeds.

Figure 7:
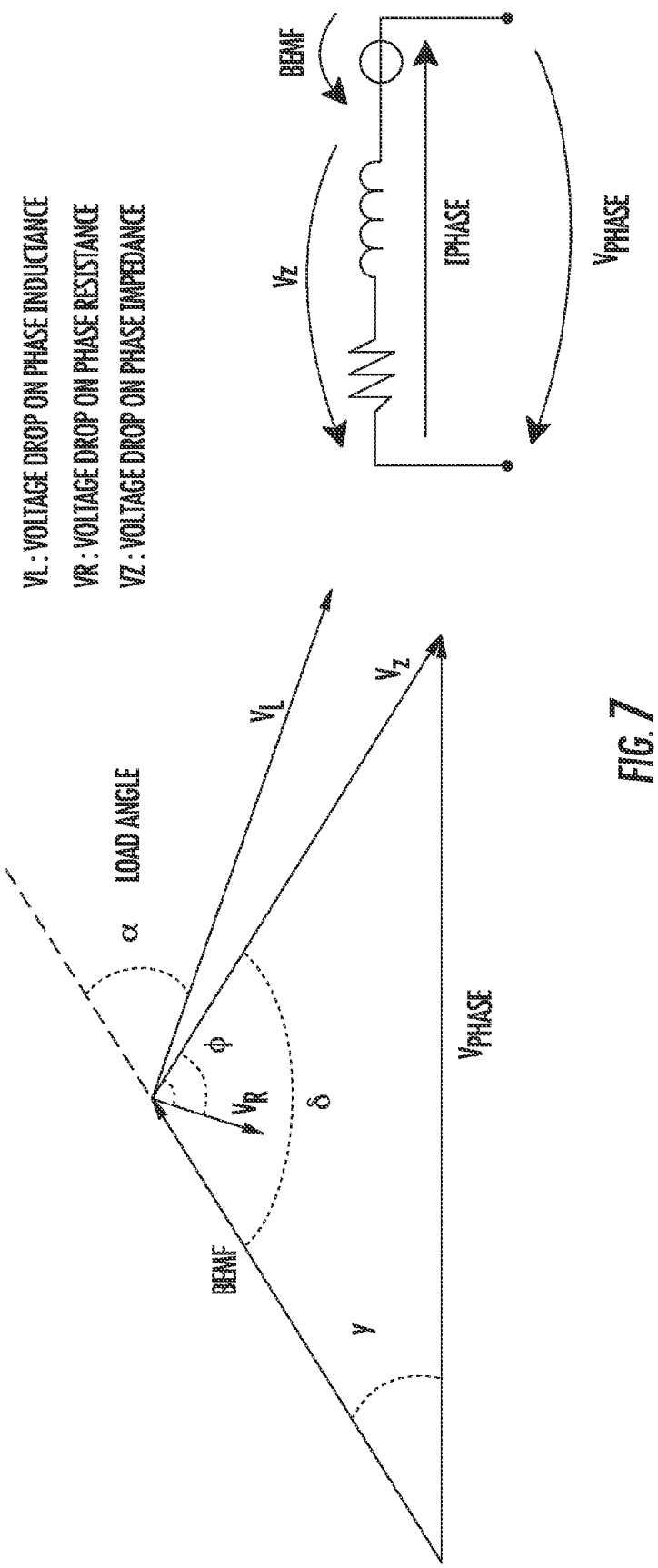
FIG. 7 is a graph of phasors representing the voltage drops on the inductance, the resistance, the impedance of the stepper motor, the back-electromotive force and the phase voltage.

By considering the phasors depicted in FIG. 7 and using the following formula, it may be possible to calculate the voltage amplitude to apply to the motor windings to keep the amplitude of the phase current relatively constant:

$$\Phi = a\tan(\omega_{EL} \cdot L/R);$$

$$\delta = \pi - \alpha + \Phi;$$

$$|V_{PHASE}|^2 = |V_2|^2 + |BEMF|^2 - 2 \cdot \cos(\delta) \cdot |V_z| \cdot |BEMF|;$$

$$I_{PHASE} = V_2/(R + i\omega_{EL}L);$$

where $V_{PHASE}$ and $I_{PHASE}$ are the phase voltage and current, $V_z$ is the voltage drop on the phase impedance, R and L the resistance and inductance of the winding, $\omega_{EL}$ the electrical frequency ($2\pi f_{step}/4$), BEMF the back electromotive force, and a the load angle.

Using the vector formula describing the electrical model of a phase of a stepper motor:

$$V_{PHASE}(\omega_{EL}) = V_Z(\omega_{EL}) + BEMF(\omega_{EL}) = I_{PHASE} \cdot (R + i\omega_{EL}L) + BEMF(\omega_{EL})$$

Figure 8:
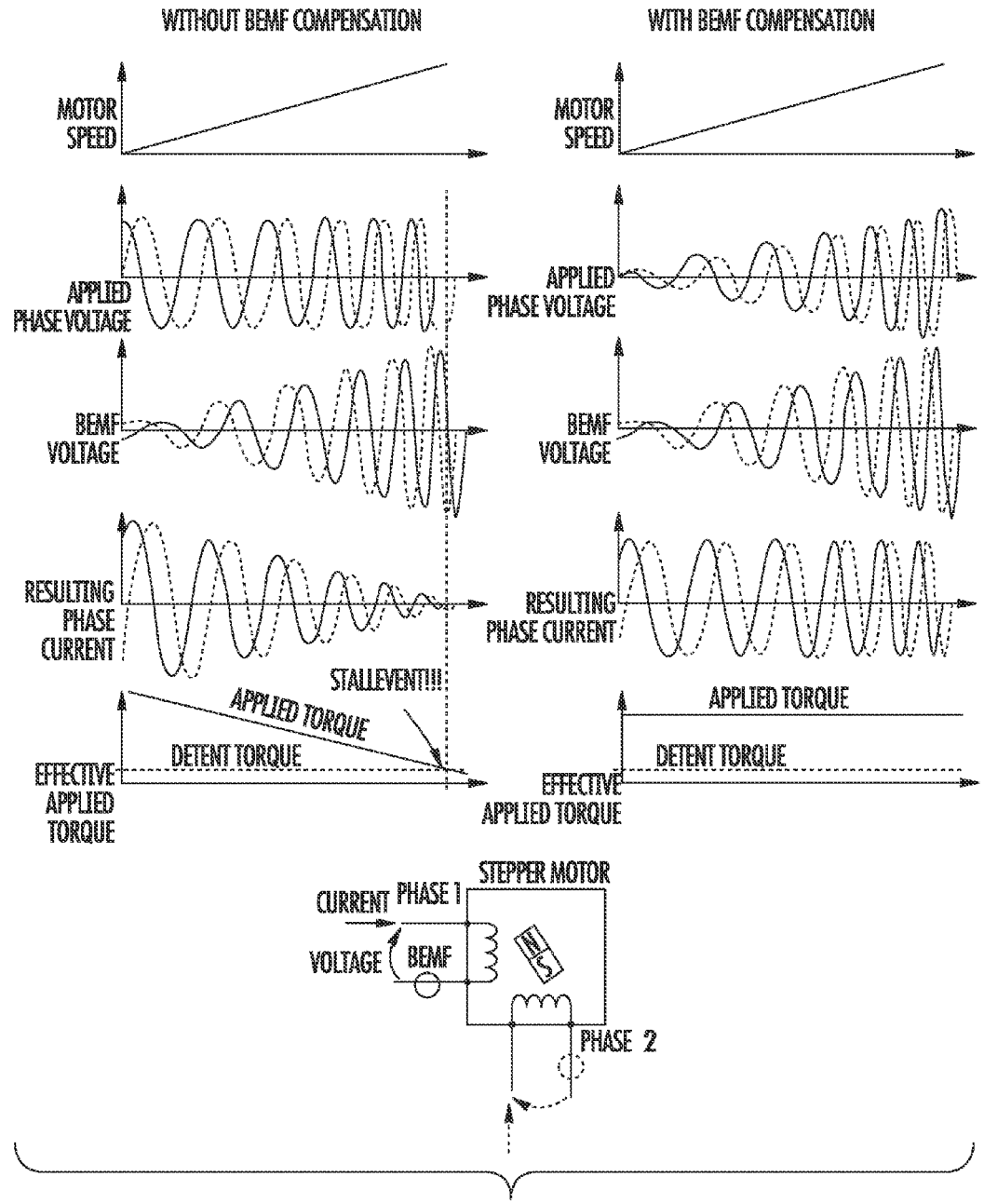
FIG. 8 are the graphs of FIG. 4 compared with graphs from a theoretical compensation of the back-electromotive force of the present invention.

The target of an ideal compensation may include supplying a phase voltage $V_{PHASE}$ able to produce a constant $I_{PHASE}$ current independently from the motor speed (or equivalently $\omega_{EL}$). FIG. 8 compares time graphs of the phase current with and without compensating the back electromotive force.

A problem for a practical implementation of such compensation may be the increasingly difficult resolution of the above equation due to its complex nature (the term $R + i\omega L$) and the dependence of the BEMF voltage from the motor speed. Indeed, the current has a relatively complex dependence from the applied phase voltage from electrical parameters of the motor and from the phase angle $\lambda$ between the BEMF and the applied phase voltage:

$$I_{PHASE} = \frac{1}{R} \cdot \cos\left(\arctan\left(\omega_{EL} \cdot \frac{L}{R}\right)\right) \cdot \sqrt{|V_{PHASE}|^2 + |BEMF|^2 - |V_{PHASE}| \cdot |BEMF| \cdot \cos(\lambda)}$$

Resolving this equation, to obtain the explicit formula of the phase voltage to be applied for various speeds may be relatively very complex and computationally onerous.

To devise a less difficult but effective compensation method, the following relationship may be considered:

$$|V_{PHASE}(\omega_{EL})| \leq |I_{PHASE}| \cdot |R + i\omega_{EL}L| + |BEMF(\omega_{EL})|,$$

According to the method, the amplitude of the phase voltage to be applied to keep the phase current substantially constant is:

$$|V_{PHASE}(\omega_{EL})| = |I_{PHASE}| \cdot |R + i\omega_{EL}L| + |BEMF(\omega_{EL})|$$

or, more simply, $$|V_{PHASE\_APPLIED}(\omega_{EL})| = |I_{PHASE\_TARGET}| \cdot \sqrt{R^2 + \omega_{EL}^2 L^2} + k_E \cdot \omega_{EL}$$

where $|V_{PHASE\_APPLIED}|$ is the amplitude of the sinusoidal voltage to be applied to each phase and $|I_{PHASE\_TARGET}|$ is the amplitude of a desired sinusoidal phase current.

Figure 9:
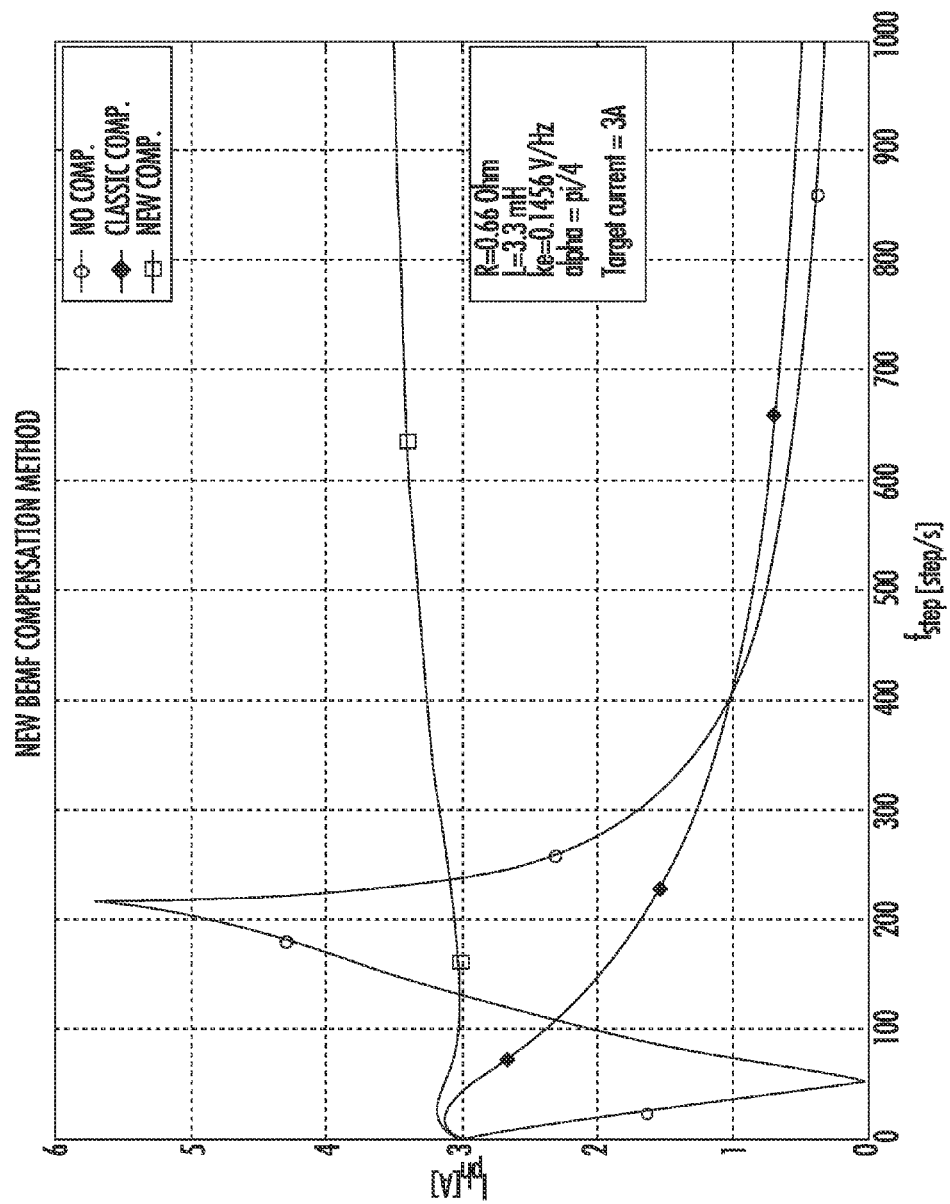
FIG. 9 is a graph comparing the waveforms of the real amplitude of the phase current in a brushless DC motor using a classic back-electromotive force compensation technique and no compensation with similar waveforms generated from the method of the present invention.

FIG. 9 illustrates what the resulting phase current obtained by implementing the compensation method would be using the above $V_{PHASE}$ vs. $I_{PHASE}$ approximated relationship. The phase current is substantially constant, as desired. Compared with the traditional $k \cdot f$ compensation technique, the method provides improved performance. The control characteristic defined by the above formula may be implemented by a microprocessor, a DSP, or any suitable digital control machine.

The illustrated embodiment of the method used may perform nonlinear operations that may take too long to be executed by a relatively low-cost digital control system. Nevertheless, a further level of approximation may be applied to the above compensation formula to reduce the calculation for the control system and making its implementation easier.

Figure 10:
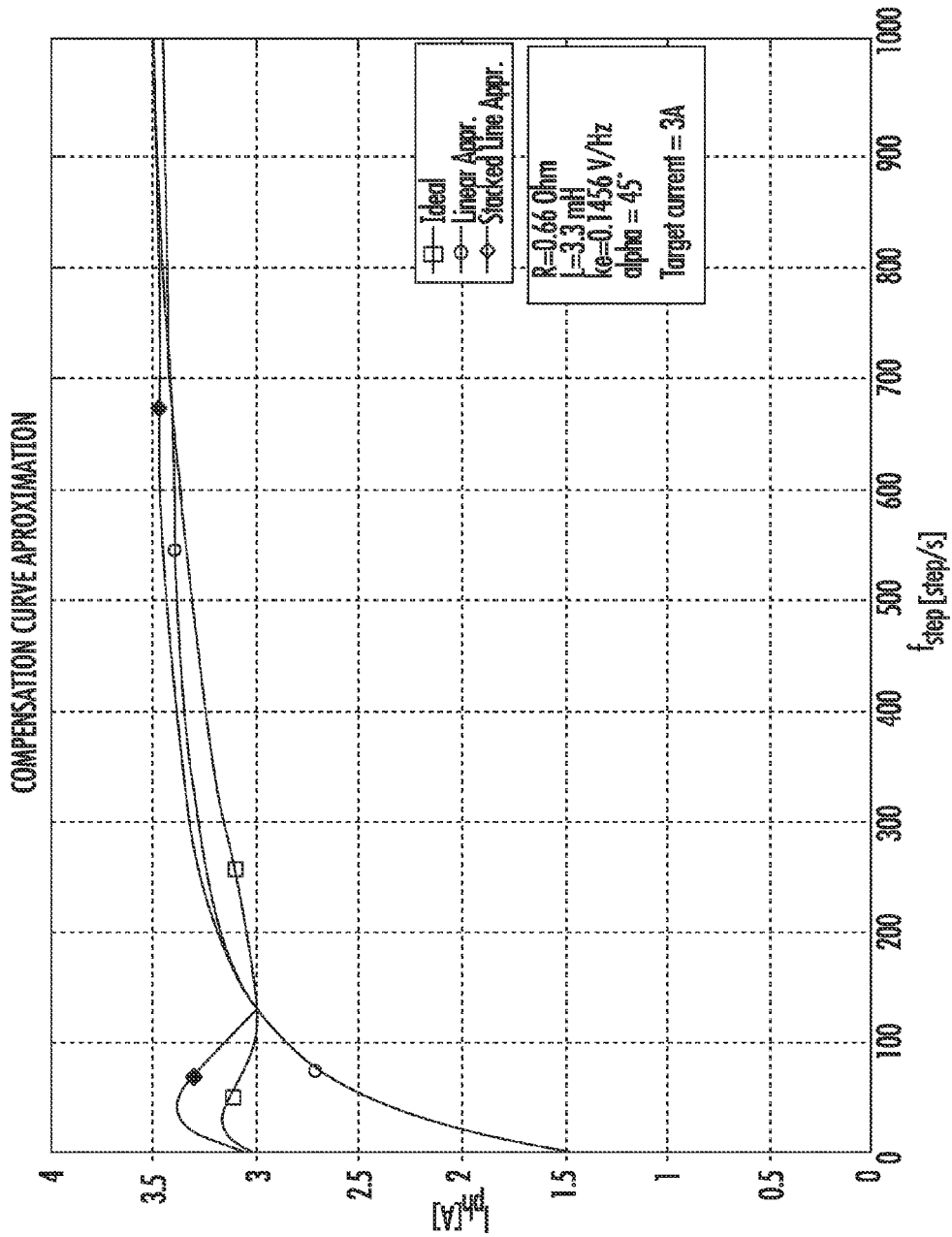
FIG. 10 is a graph comparing three exemplary waveforms of the real amplitude of the phase current obtained with the method of the present invention using three different transfer functions.

A possible approximation of the control characteristic is the linear approximation. This may allow phase current fluctuations to be reduced in respect to the prior $k \cdot 7$ approximation method in the whole range of the step speed. In FIG. 10, the result of a linear approximation obtained through the method called "ordinary least squares" (OLS, best fitting algorithm) is shown.

This method differs from the known $k \cdot f$ approximation method because the constant k is not related to the electrical constant of the motor, but to a "best fitting" constant given by the OLS technique, which makes it depend also on the electrical parameters (R and L) of the motor.

This approach may be less preferred because the current compensation performance at relatively low speeds is generally not substantially constant in the whole speed range, but are worse than at high speeds.

A more accurate fitting of the following formula:

$$|V_{PHASE\_APPLIED}(\omega_{EL})|=|I_{PHASE\_TARGET}|\cdot\sqrt{R^2+\omega_{EL}^2 L^2}+k_E\cdot\omega_{EL}$$

may be obtained with a composition of linear approximations. According to an embodiment of the control method, the following relationships may be used:

$$|V_{PHASE\_APPLIED}(\omega_{EL})| = \begin{cases} |I_{PHASE\_TARGET}|\cdot R + k_E\cdot\omega_{EL} & \text{for } \omega_{EL} << \frac{R}{L} \\ |I_{PHASE\_TARGET}|\cdot \omega_{EL} L + k_E\cdot\omega_{EL} & \text{for } \omega_{EL} >> \frac{R}{L} \end{cases}$$

FIG. 10 compares simulation results of a compensation method using a 3 point stacked line approximation for the applied phase voltage. The graph shows that this approximation offers a satisfactory result in respect to the other compensation methods.

As explained in previous paragraphs, the applied phase voltage may be proportional to the duty cycle applied to the motor phase. For example, during microstep driving, a sinusoidal duty cycle may be applied to the PWM control signal. To control the amplitude of such sinusoidal driving signal, the amplitude of the sinusoidal duty cycle may be constant (Kval value).

The amplitude of sinusoidal control signal may be given by the following relationship:

$$\overline{V_{PHASE}}=V_s\cdot Kval$$

wherein $V_s$ is the supply voltage.

A way of compensating the BEMF voltage includes acting on the amplitude of the sinusoidal voltage by varying the value Kval. The compensation factor may be multiplied by the original Kval value imposed by the user.

By developing the above $V_{PHASE}$ vs. $I_{PHASE}$ approximated relationship:

$$\overline{V_{PHASE}} = |V_{PHASE\_APPLIED}(\omega_{EL})| ==$$
$$\begin{cases} |I_{PHASE\_TARGET}|\cdot R + k_E\cdot\omega_{EL} = Kval_1 & \text{for } \omega_{EL} << \frac{R}{L} \\ |I_{PHASE\_TARGET}|\cdot \omega_{EL} L + k_E\cdot\omega_{EL} = Kval_2 & \text{for } \omega_{EL} >> \frac{R}{L} \end{cases}$$

Figure 11:
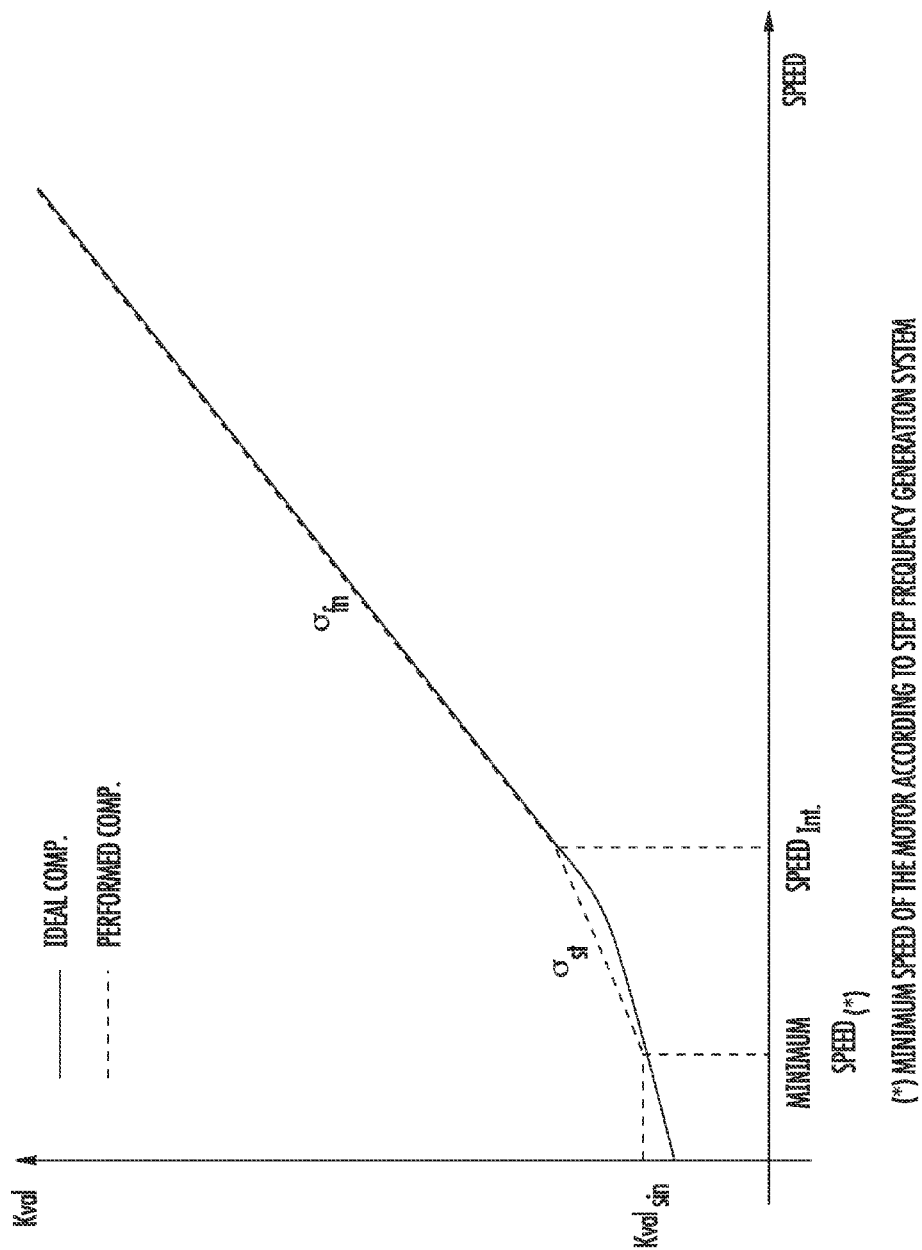
FIG. 11 is a graph of an exemplary transfer function for determining the phase voltage as a function of the motor speed, as in the present invention.

According to another embodiment, two different Kval values may be used, depending on the motor speed:

$$Kval(\text{Speed}) =$$
$$\begin{cases} Kval_1(\text{Speed}) = Kval_{min} + \text{Speed}\cdot\sigma_{st} & \text{if Speed} \leq \text{Speed}_{int} \\ Kval_2(\text{Speed}) = Kval_{min} + \text{Speed}_{int}\cdot\sigma_{st} + \text{Speed}\cdot\sigma_{fn} & \text{if Speed} > \text{Speed}_{int} \end{cases}$$

where $Kval_{min}$ is the starting Kval value, Speed is the motor speed programmed by the user, $\sigma_{st}$ is the Starting Slope parameter, $\sigma_{fn}$ is the Final Slope parameter and $\text{Speed}_{int}$ is the Intersect Speed parameter. FIG. 11 compares the stacked line defined by the above equation and the ideal characteristic.

Figure 12:
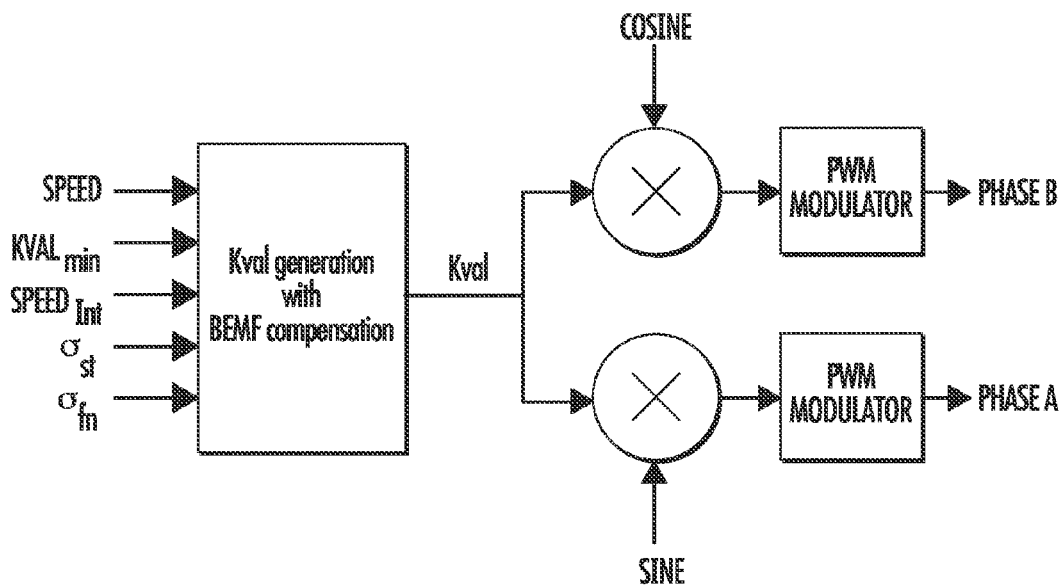
FIG. 12 is a high level block diagram of a circuit according to the present invention.

An exemplary digital circuit for generating PWM signals with a duty cycle amplitude determined according to the stacked line characteristic of FIG. 11 is shown in FIG. 12. Different parameter values can be programmed according to the motor and system characteristics, and may depend on the desired type of dynamic operation (torque, acceleration, speed, etc).

Figure 1:
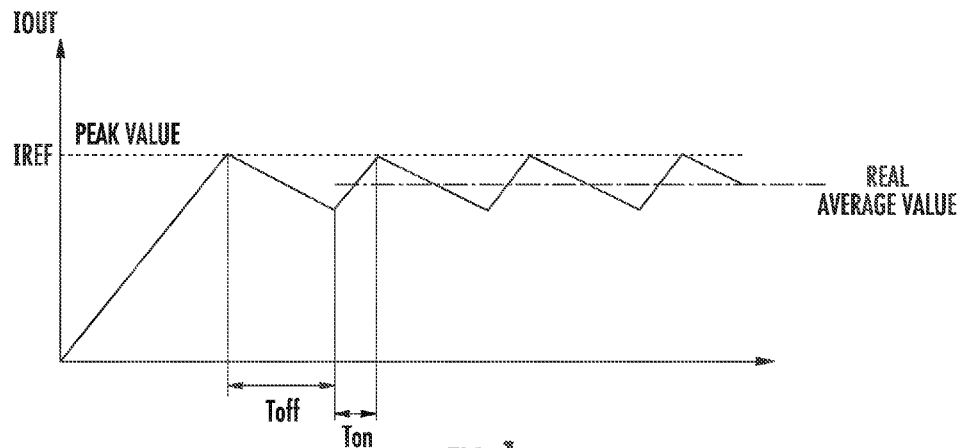
FIG. 1 is a graph of an exemplary current waveform in a load driven according to a PWM peak current control mode, as in the prior art.
Figure 2A:
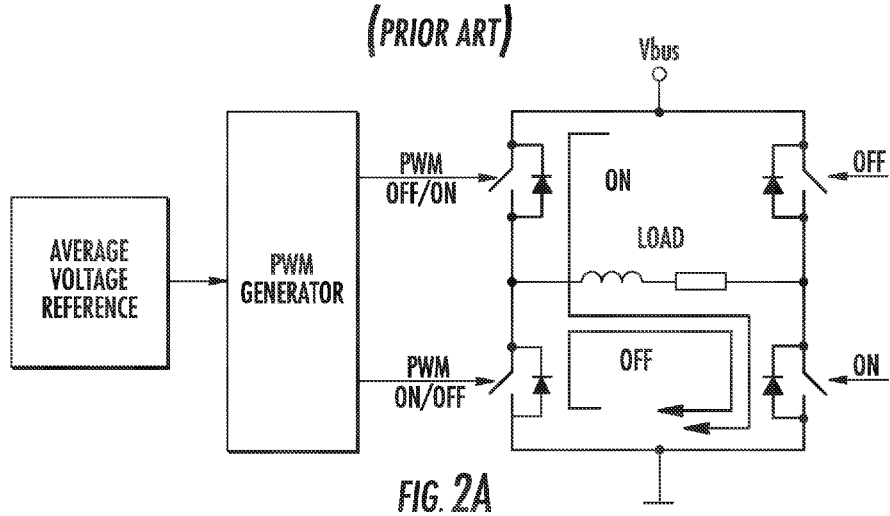
FIG. 2a is a schematic block diagram of a voltage mode driver in accordance with the prior art.
Figure 2B:
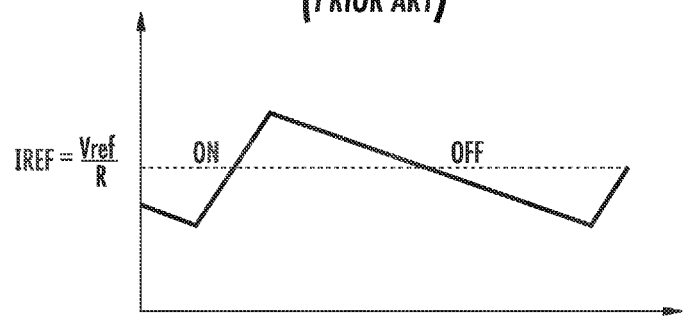
FIG. 2b is a graph of a PWM voltage mode driving of an inductive load, as in the prior art.
Figure 3:
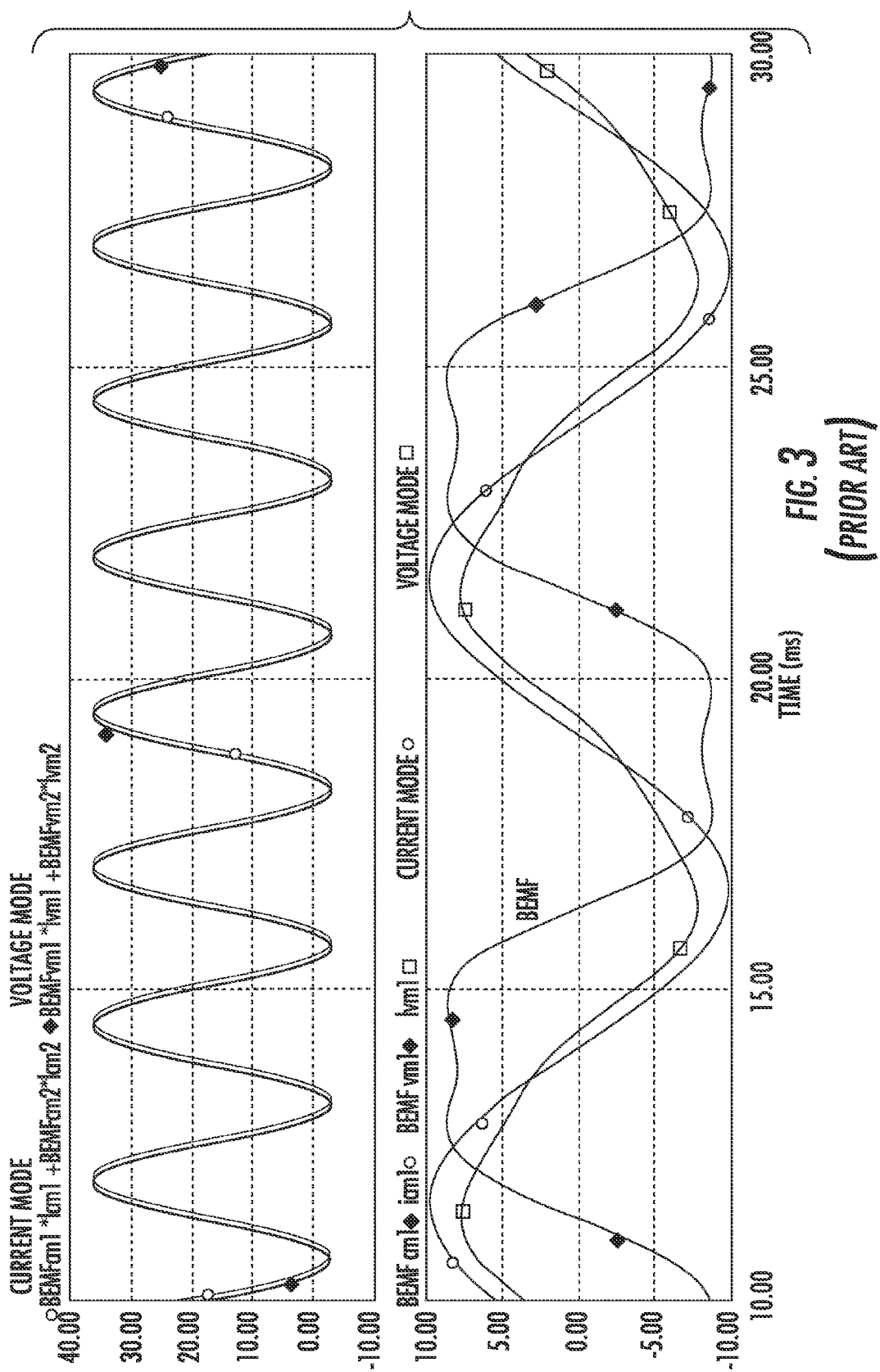
FIG. 3 are graphs of waveforms of the current and of the back-electromotive force of a driven load in a current mode and in a voltage mode, as in the prior art.
Figure 4:
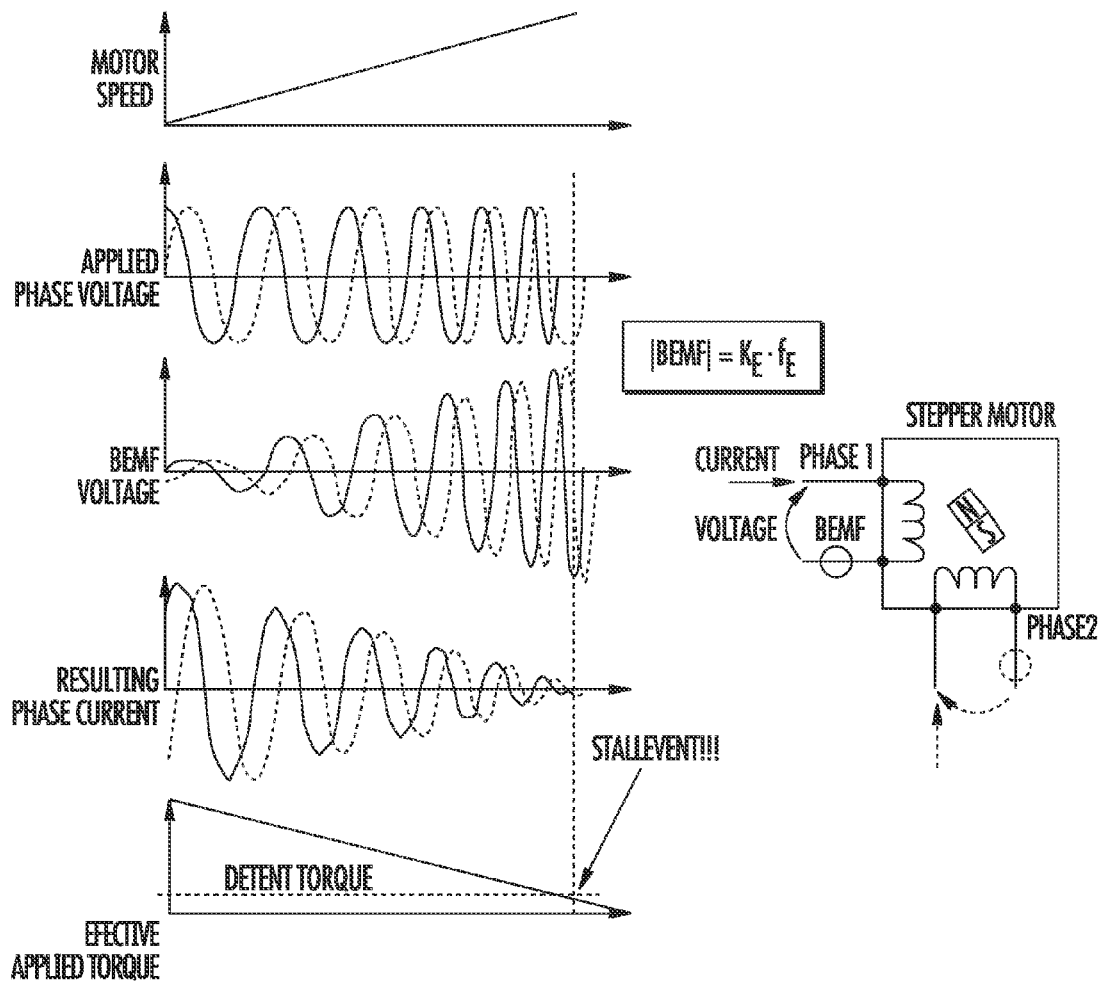
FIG. 4 are graphs and a corresponding schematic circuit diagram illustrating a circumstance in which a stall event may occur in a stepper motor driven in a voltage mode because of the increasing back electromotive force, as in the prior art.
Figure 5:
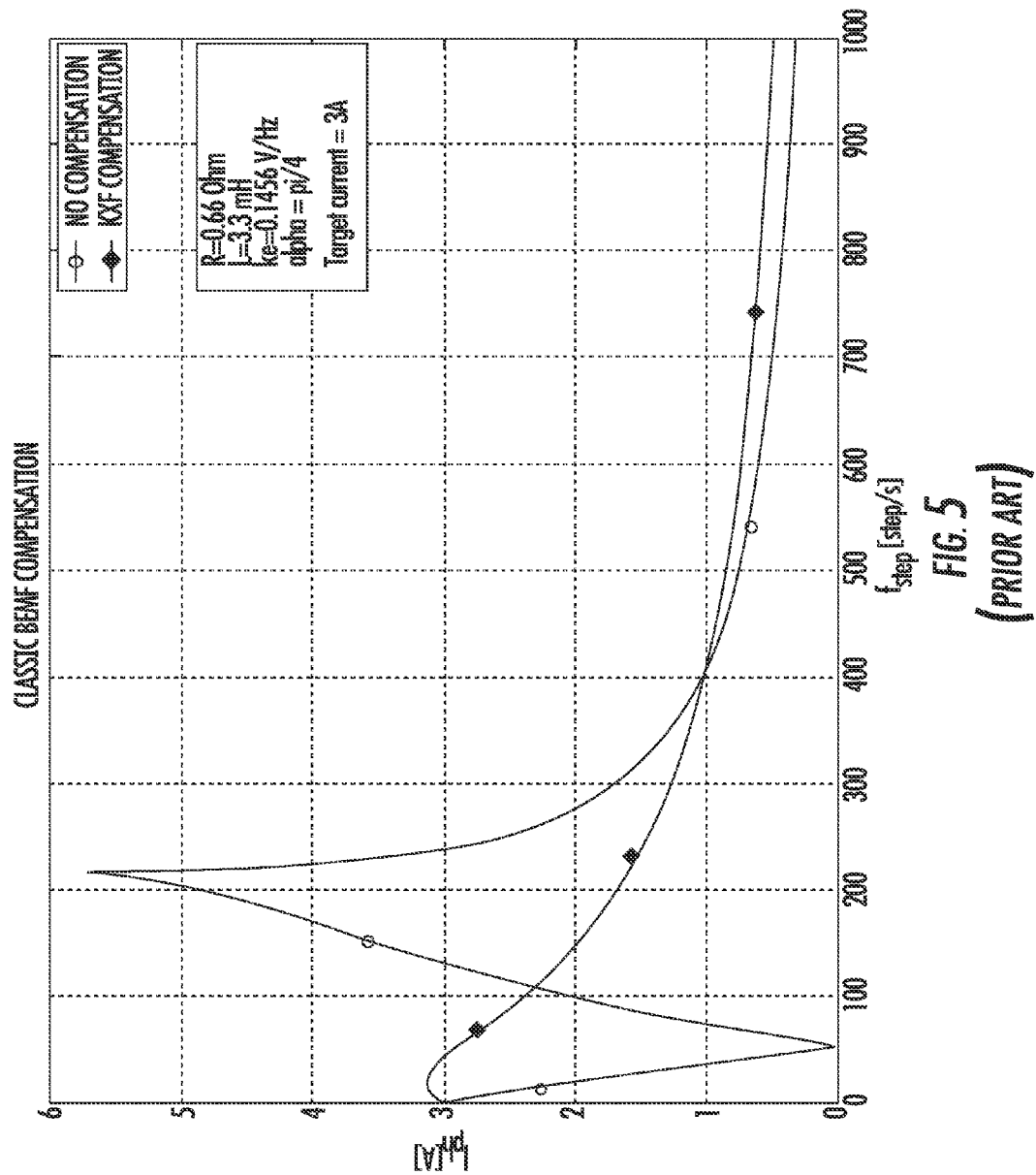
FIG. 5 is a graph of the real amplitude of the phase current in a brushless DC motor using a classic back-electromotive force compensation technique and no compensation, as in the prior art.
Figure 6:
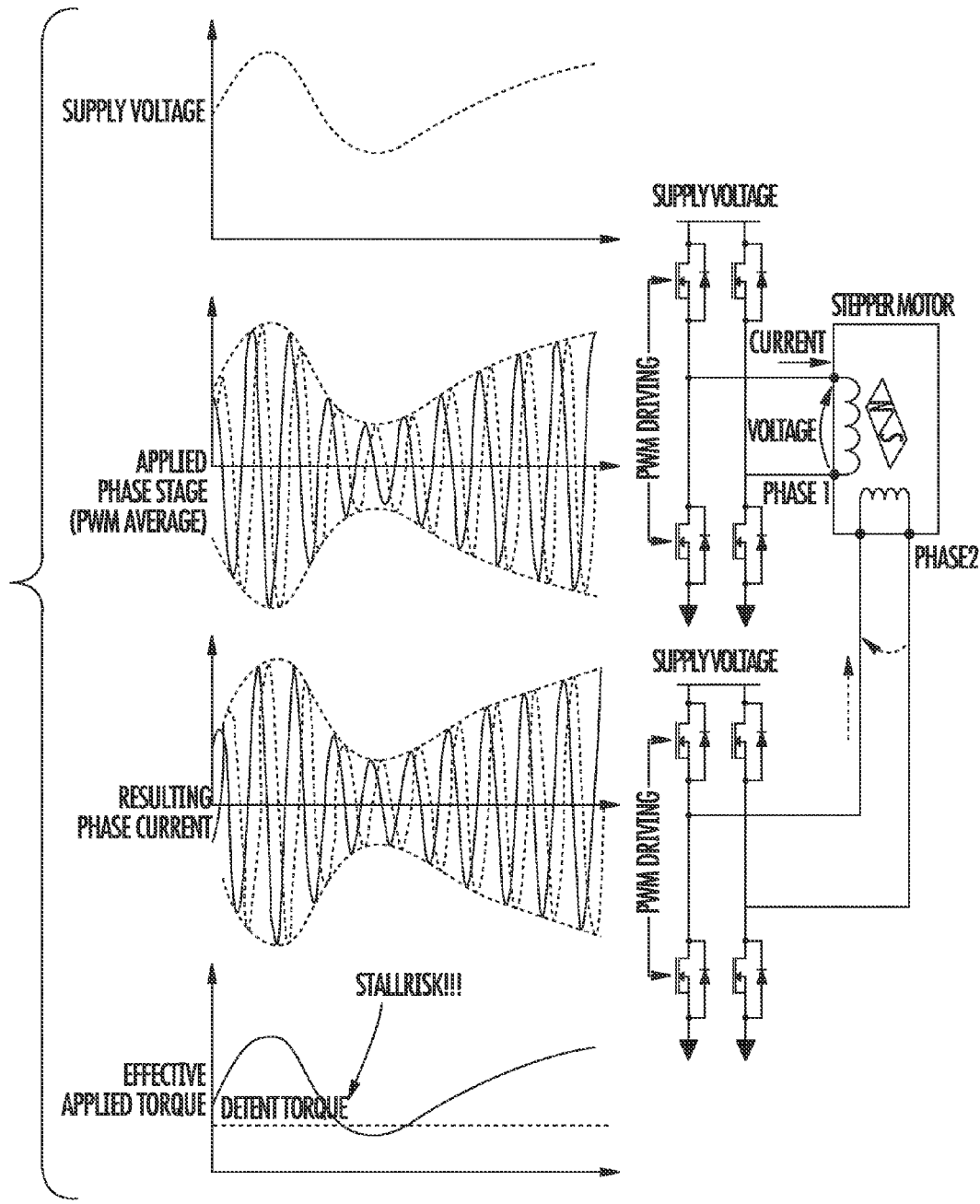
FIG. 6 are graphs and a corresponding schematic circuit diagram illustrating a circumstance in which a stall event may occur in a stepper motor driven in a voltage mode because of supply voltage fluctuations, as in the prior art.

Another drawback of voltage mode driving may include the undesired dependence of the produced torque from the supply voltage of the power bridges that drive the stepper motor, as illustrated in FIG. 6.

Numerous motor stepper drivers use power bridges to energize the phase motor inductances with a PWM switching technique to modulate energy in a desired way. By regulating the duty cycle of each half bridge it may be possible to control the average phase voltage in a PWM switching period. In the voltage mode approach, the applied average voltage may be directly proportional to the effective duty cycle applied to each power full bridge and the power stage supply voltage. This means that if the supply voltage were constant, the control of the average phase voltage would be relatively easy to implement at the controller level.

Unfortunately, in most real motor applications, the supply voltage may not be well regulated, and it may undergo significant voltage fluctuations due to various factors, for example, to fluctuations of load conditions of a voltage regulator that delivers the supply voltage of the motor. The effect of supply voltage fluctuations is shown in FIG. 6. The dependence of average phase voltage on both supply voltage and duty cycle may produce an undesired amplitude modulation in typical sinusoidal waveforms that may cause undesired variations of the produced torque.

Therefore, the torque may not be constant, but may depend for example on the supply voltage. This dependence may have a double negative impact. Torque fluctuations may cause acoustic noise and vibration in resonance with supply voltage fluctuations. Additionally, any drop of the supply voltage may cause a corresponding drop of the produced torque that could attain the value of the detent torque of the driven motor, thus risking losing steps and/or stalling the stepper motor.

Considering that the average phase voltage may be proportional to the motor supply voltage ($V_s$), any variation of the supply voltage from its nominal value ($V_{s,nom}$) generally affects the system performances. In terms of Kval:

$$\overline{V_{PHASE}}=V_S\cdot Kval=(V_{S,nom}+\Delta V_S)\cdot Kval$$

Motor supply voltage variation can be expressed by a coefficient $\delta_{vs}$:

$$V_S = (V_{S,nom}+\Delta V_S) = V_{S,nom}\cdot\left(1+\frac{\Delta V_S}{V_{S,nom}}\right) = V_{S,nom}\cdot\delta_{VS}$$

Figure 14:
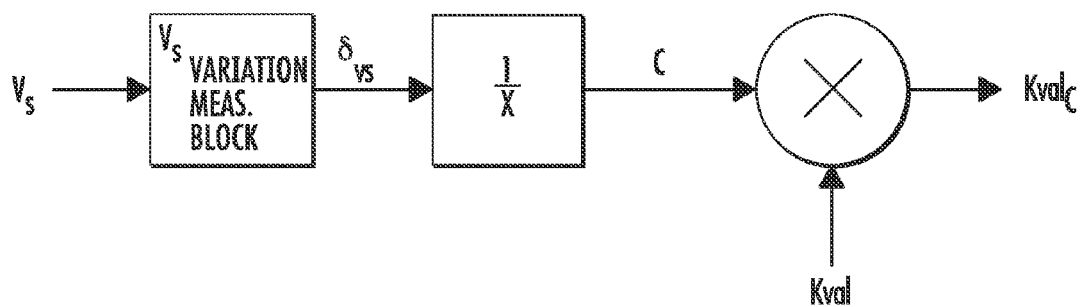
FIG. 14 is a high level block diagram of a circuit according to the present invention.
Figure 13:
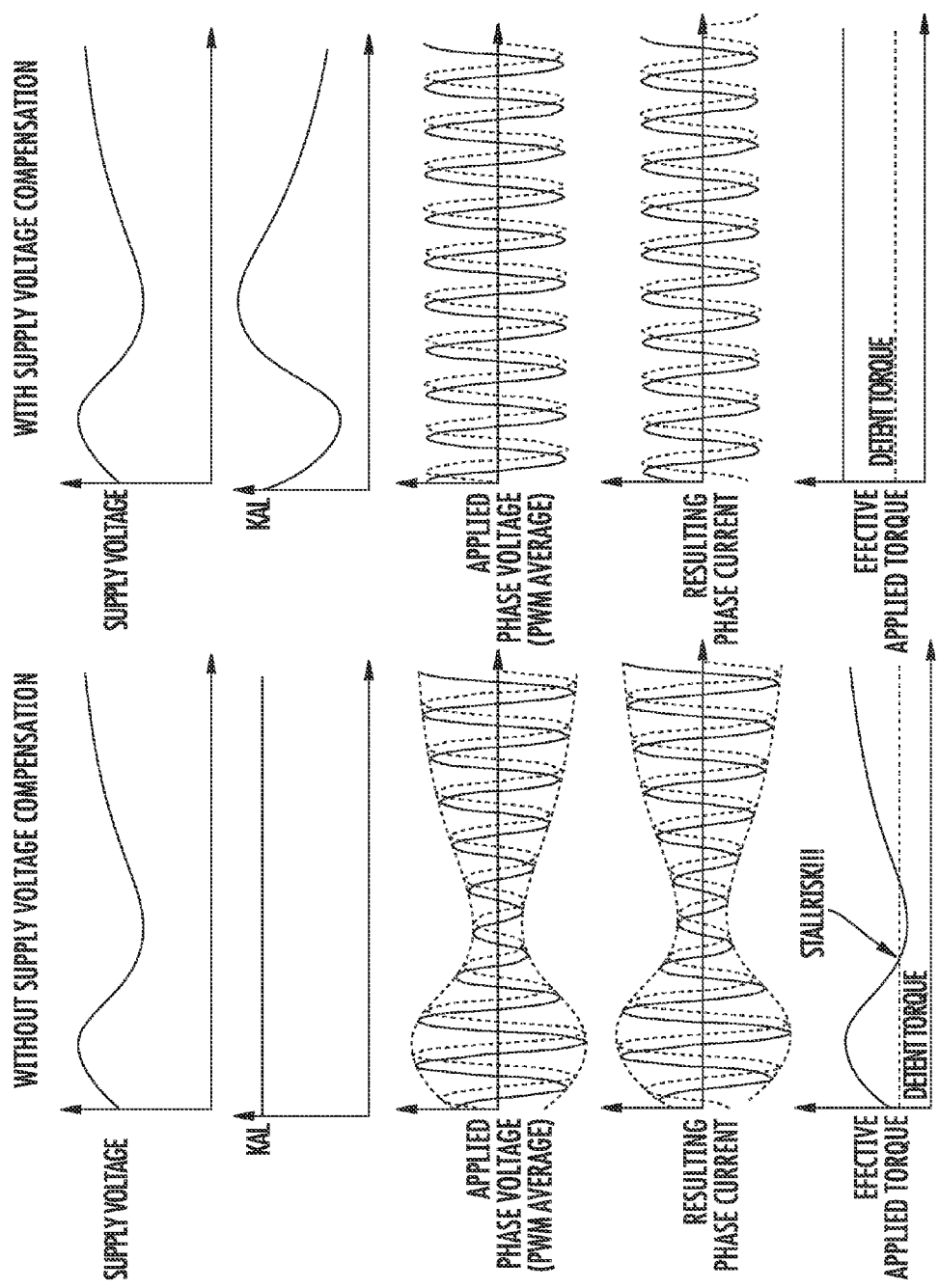
FIG. 13 are the graphs of FIG. 6 compared with similar waveforms obtained according to the method of the present invention.

According to another embodiment of the voltage mode driving method, the parameter Kval may be varied as depicted in FIG. 13. The parameter $\delta_{vs}$ may be compensated multiplying Kval by a compensation coefficient C. The coefficient C is obtained as the reciprocal of $\delta_{vs}$, for example as schematically illustrated by the block diagram of FIG. 14 depicting an exemplary control line.

The resulting Kval value ($Kval_c$) is applied to motor phase:

$$\overline{V_{PHASE}} = V_S\cdot Kval_C =$$
$$(V_{S,nom}\cdot\delta_{VS})\cdot(Kval\cdot C) == (V_{S,nom}\cdot\delta_{VS})\cdot\left(Kval\cdot\frac{1}{\delta_{VS}}\right) = V_{S,nom}\cdot Kval$$

When a stepper motor driven in the voltage mode is near a stall (step loss), the current in its phases rapidly increases.

Figure 15:
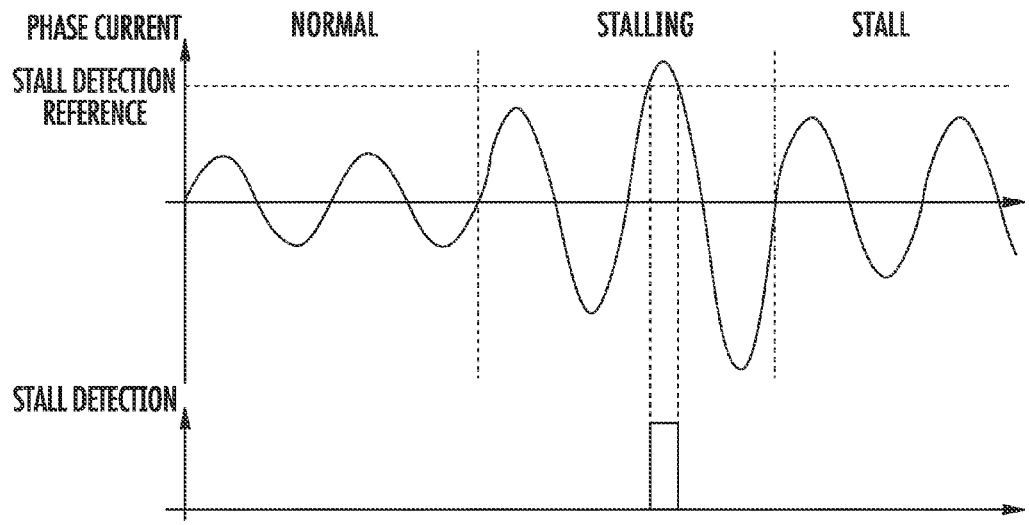
FIG. 15 is a graph of an imminent or in progress stall condition if the stepper motor is driven according to the present invention.
Figure 16:
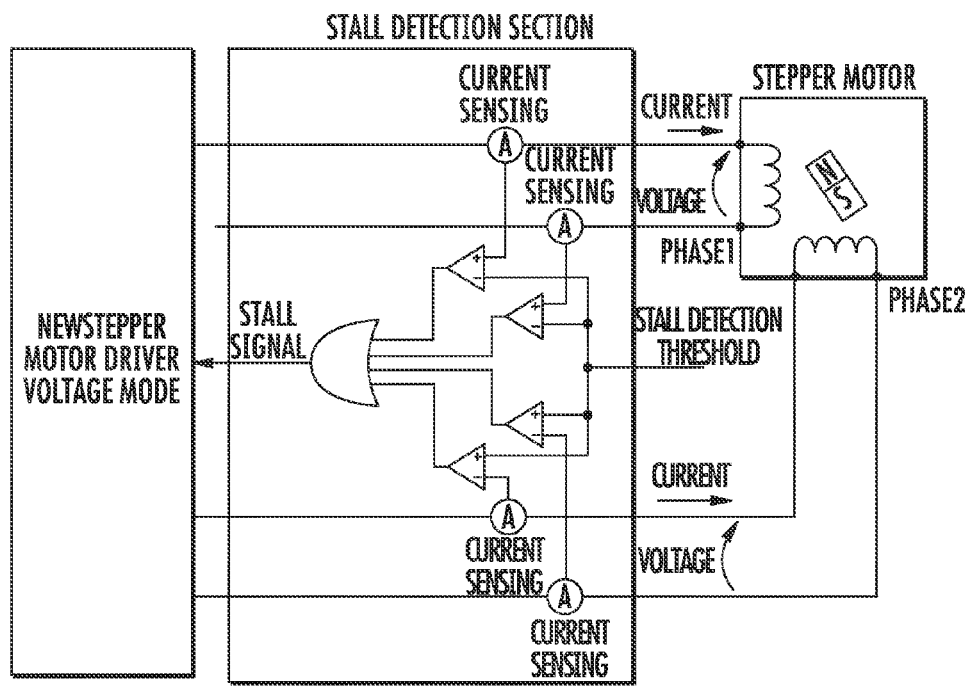
FIG. 16 is a block diagram of a circuit for generating a logic flag according to the present invention.

This is due to the fact that the BEMF voltage is proportional to the motor speed and is null when the motor is at rest. When a stall event is imminent or in progress, the phase current abruptly increases, as shown in FIG. 15, and this effect could be used to detect stall conditions. Using a programmable comparator may make it possible to sense this overelongation and inform the host processor of a possible or incoming stall event. A system capable of detecting motor stall conditions caused by excessive mechanical load (and/or insufficient current) without using any speed sensor is illustrated in FIG. 16.

Figure 17:
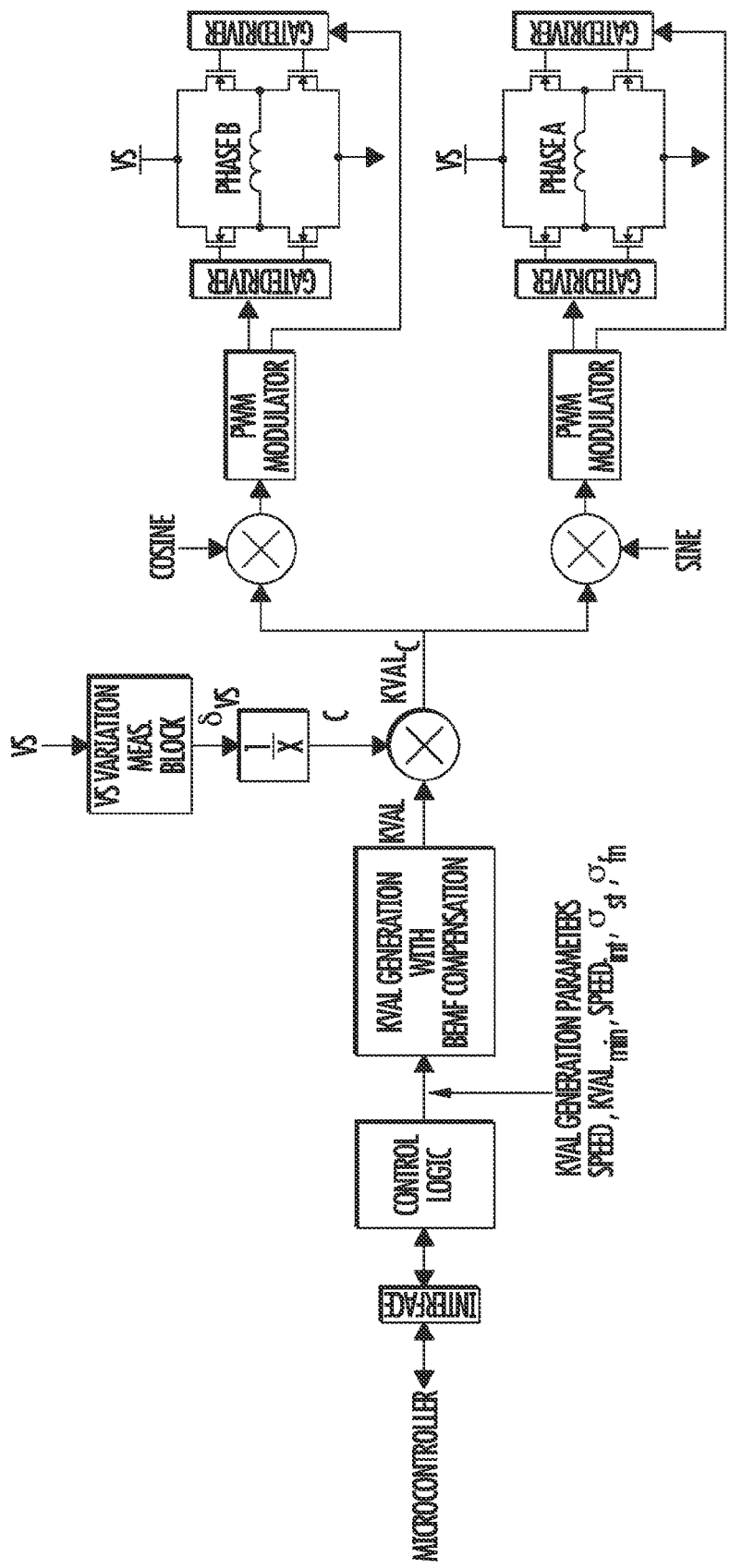
FIG. 17 is a block diagram of a PWM control circuit according to the present invention.

Analog current comparators may be used to detect when currents through the windings exceed the normal operative range. FIG. 17 is a block diagram of the proposed control system. The meaning of each functional block will appear per se clear from the above description, and for this reason it will not be illustrated in detail.

The driving technique for stepper motors exhibits improved performance both in static conditions, in terms of accuracy of rotor positioning, as well as in dynamic conditions, for example, in terms of relatively high smoothness and relatively very low noise during motor rotation, and torque performances at relatively high speed. Moreover, by using the control method and system it may be possible to detect an imminent or in progress stall condition without using position or speed sensors.

The control technique provides improved positioning accuracy typical of stepper motors with the dynamic performances and smoothness typical of common DC motors. The practical implementation of the motor control system includes a relatively straightforward architecture. Indeed, because of a reduction of the number of analog blocks that are typically desired in known stepper drivers, the control method may be implemented using a fully digital control system.

That which is claimed:

1. A method of driving a stepper motor in feed-forward voltage mode, comprising:
    for a desired speed for the stepper motor, setting an amplitude of a sinusoidal phase voltage of the stepper motor to be equal to a sum of a voltage value estimated as a function of the desired speed, and a product of a desired phase current amplitude and an estimated absolute value of an impedance of the stepper motor.

2. The method of claim 1, further comprising for the desired speed, setting the amplitude of the sinusoidal phase voltage according to a transfer function that assumes a minimum value for speed values smaller than a minimum speed, and that increases with a fixed slope for speed values larger than the minimum speed; and wherein the minimum value, the minimum speed, and the fixed slope are determined as a function of nominal values of electrical parameters of the stepper motor and of an estimation of back-electromotive force, BEMF, amplitude induced in windings of the stepper motor.

3. The method of claim 1, further comprising driving the stepper motor in a pulse width modulation, PWM, mode at a fixed frequency and having a duty-cycle that is proportional to the sinusoidal phase voltage.

4. The method of claim 2, wherein for speed values greater than a second speed threshold and greater than the minimum speed, the transfer function increases with a second fixed slope steeper than the fixed slope.

5. The method of claim 3, further comprising setting the duty-cycle of the PWM mode for setting the desired speed as a ratio between the duty-cycle determined to be proportional to the sinusoidal phase voltage and to a measured percentage fluctuation of voltage supplied to the stepper motor with respect to a nominal value of the stepper motor.

6. A method of generating an alarm flag of a stall condition of a stepper motor driven in feed-forward voltage mode, the method comprising:
    for a desired speed for the stepper motor, setting an amplitude of a sinusoidal phase voltage of the stepper motor to be equal to a sum of a voltage value estimated as a function of the desired speed and a product of a desired phase current amplitude and an estimated absolute value of an impedance of the stepper motor;
    comparing the phase current with a threshold; and
    generating the alarm flag when the threshold is exceeded.

7. The method of claim 6, wherein the stall condition comprises at least one of an imminent and an in progress stall condition.

8. The method of claim 6, further comprising driving the stepper motor in a pulse width modulation, PWM, mode at a fixed frequency, and having a duty-cycle that is proportional to the sinusoidal phase voltage.

9. A method of driving a stepper motor in a feed-forward voltage mode, comprising:
    for a desired stepper motor speed, setting a phase voltage of the stepper motor based upon a sum of a voltage value and a product of a desired phase current and an estimated absolute value of an impedance of the stepper motor.

10. The method of claim 9, further comprising for the desired stepper motor speed, setting the phase voltage according to a transfer function having a default speed for a speed below a low speed threshold and increasing with a fixed slope for speeds greater than the low speed threshold; and wherein the default speed, the low speed threshold, and the fixed slope are a function of electrical parameters of the stepper motor and of an estimation of back-electromotive force, BEMF, induced in windings of the stepper motor.

11. The method of claim 9, further comprising driving the stepper motor in a pulse width modulation, PWM, mode at a fixed frequency, and having a duty-cycle that is proportional to the phase voltage.

12. The method of claim 10, wherein the transfer function increases with a second fixed slope steeper than the fixed slope for speeds greater than a second speed threshold and greater than the low speed threshold.

13. The method of claim 11, further comprising setting the duty-cycle of the PWM as a ratio between the duty-cycle determined to be proportional to the sinusoidal phase voltage and to a measured percentage fluctuation of voltage supplied to the stepper motor.

14. A method of driving a stepper motor in feed-forward voltage mode, comprising:
    for the desired speed for the stepper motor, setting the amplitude of the sinusoidal phase voltage according to a transfer function that assumes a minimum value for speed values smaller than a minimum speed, and that increases with a fixed slope for speed values larger than the minimum speed;
    the minimum value, the minimum speed, and the fixed slope being determined as a function of nominal values of electrical parameters of the stepper motor and of an estimation of back-electromotive force, BEMF, amplitude induced in windings of the stepper motor.

15. The method of claim 14, further comprising driving the stepper motor in a pulse width modulation, PWM, mode at a fixed frequency and having a duty-cycle that is proportional to the sinusoidal phase voltage.

16. The method of claim 14, wherein for speed values greater than a second speed threshold and greater than the minimum speed, the transfer function increases with a second fixed slope steeper than the fixed slope.

17. A system for driving a stepper motor in a feed-forward voltage mode, the system comprising:
- a power stage configured to energize windings of the stepper motor; and
- a control circuit having an input for receiving a speed value for the stepper motor, said control circuit being configured to generate control signals of said power stage for making the stepper motor rotate at a desired speed;
- said control circuit being configured to generate the control signals to set an amplitude of a sinusoidal phase voltage of the stepper motor by at least
  - setting the amplitude of the sinusoidal phase voltage of the stepper motor to be equal to a sum of a voltage value estimated as a function of the desired speed, and a product of the desired phase current amplitude and an estimated absolute value of an impedance of the stepper motor.

18. The system of claim 17, further comprising a alarm flag circuit configured to generate an alarm flag based upon a stall condition of the stepper motor, the alarm flag circuit comprising:
- at least one current sensor generating a sense signal representative of the phase current amplitude of the stepper motor; and
- at least one a comparator configured to compare the sense signal with a threshold and generate the alarm flag when the threshold is exceeded.

19. The system according to claim 18, wherein the stall condition comprises at least one of an imminent and in progress stall condition.

20. A system for driving a stepper motor in a feed-forward voltage mode, the system comprising:
- a power stage configured to energize windings of the stepper motor; and
- a control circuit comprising an input for receiving a command representing a desired speed of the stepper motor, said control circuit being configured to generate control signals for said power stage based upon the command, the control signal causing the stepper motor to rotate at the desired speed;
- said control circuit being configured to generate the control signals to set a phase voltage of the stepper motor by at least
  - setting the phase voltage of the stepper motor to be based upon a sum of a voltage value and a product of the desired phase current and an estimated absolute value of an impedance of the stepper motor using a controller.

21. The system of claim 20, further comprising a alarm flag circuit coupled to said control circuit and configured to generate an alarm flag based upon at a stall condition of the stepper motor, the alarm flag circuit comprising:
- at least one current sensor configured to generate a sense signal based upon the phase current; and
- at least one a comparator configured to compare the sense signal with a threshold and generate the alarm flag when the threshold is exceeded.

22. The system of claim 21, wherein the stall condition comprises at least one of an imminent and in progress stall condition.

* * * * *